(12) United States Patent (10) Patent No.: US 12,699,957 B2
Uchimura et al. (45) Date of Patent: Aug. 4, 2026

(54) PRODUCT REGISTRATION APPARATUS, PRODUCT REGISTRATION METHOD, AND NON-TRANSITORY STORAGE MEDIUM

(71) Applicant: NEC Corporation, Tokyo (JP)

(72) Inventors: Jun Uchimura, Tokyo (JP); Hiroshi Takahashi, Kanagawa (JP); Masato Watanabe, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/095,215

(22) Filed: Jan. 10, 2023

(65) Prior Publication Data

US 2023/0162148 A1 May 25, 2023

Related U.S. Application Data

(63) Continuation of application No. 17/333,850, filed on May 28, 2021, now Pat. No. 11,568,360, which is a continuation of application No. 16/394,504, filed on Apr. 25, 2019, now Pat. No. 11,055,660.

(30) Foreign Application Priority Data

Apr. 27, 2018 (JP) ................................. 2018-086827

(51) Int. Cl.
*G06K 7/14* (2006.01)
*G06Q 10/087* (2023.01)

(52) U.S. Cl.
CPC ......... *G06Q 10/087* (2013.01); *G06K 7/1404* (2013.01)

(58) Field of Classification Search
CPC ............................ G06Q 10/087; G06K 7/1404

USPC ........................................................ 235/385
See application file for complete search history.

(56) References Cited

U.S. PATENT DOCUMENTS

| | | | | |
|---|---|---|---|---|
| 5,609,223 | A | * | 3/1997 | Iizaka ...................... A47F 9/048 235/383 |
| 2012/0187194 | A1 | * | 7/2012 | Svetal ...................... G07G 1/01 235/470 |
| 2015/0379494 | A1 | * | 12/2015 | Hiroi ...................... G06V 10/25 705/16 |
| 2017/0083892 | A1 | * | 3/2017 | Taira .................... G06Q 20/208 |
| 2019/0019173 | A1 | * | 1/2019 | Kinno .................. G07G 1/0063 |
| 2019/0244055 | A1 | * | 8/2019 | Wu .......................... G06N 3/045 |

(Continued)

FOREIGN PATENT DOCUMENTS

| | | |
|---|---|---|
| JP | 2009-163332 A | 7/2009 |
| JP | 2013-210971 A | 10/2013 |

(Continued)

OTHER PUBLICATIONS

Japanese Office Action for JP Application No. 2018-086827 mailed on Mar. 1, 2022 with English Translation.

*Primary Examiner* — Paultep Savusdiphol

(57) ABSTRACT

According to the invention, there is provided a product registration apparatus including an information acquisition unit that determines a placement position of a product having a placing table surface side to which product information is attached and acquires the product information attached to the product, and an output unit that outputs information indicating at least one of the placement position of the product from which the product information can be acquired and the placement position of the product from which the product information cannot be acquired.

18 Claims, 20 Drawing Sheets

(56)  References Cited

U.S. PATENT DOCUMENTS

2019/0258870 A1*  8/2019  Kundu .............. G06Q 20/4016
2021/0407253 A1*  12/2021  Shigeta ................... G07D 5/00

FOREIGN PATENT DOCUMENTS

JP        2015-026130  A      2/2015
JP        2016-192091  A      11/2016
JP        2017-059208  A      3/2017
WO       2017/126253  A1      7/2017
WO       2017/126254  A1      7/2017

* cited by examiner

FIG. 6

(FRONT VIEW)

RICE BALL
KELP

101

(BOTTOM VIEW)

| SERIAL NUMBER | POSITION INFORMATION | PRODUCT INFORMATION |
|---|---|---|
| 1 | ( ⋯ , ⋯ ) | PRODUCT IDENTIFICATION INFORMATION : 32882509 |
| 2 | ( ⋯ , ⋯ ) | |
| ⋮ | ⋮ | ⋮ |

FIG. 10

| PRODUCT NAME | QUANTITY | IMAGE |
|---|---|---|
| RICE BALL TUNA MAYONNAISE | 1 | |
| | | |
| | | |
| | | |

FIG. 16

| PRODUCT NAME | QUANTITY | | JUDGMENT | IMAGE |
|---|---|---|---|---|
| WEST TEA (500ml) | 2 | | | |
| RAMEN A (SOY SAUCE FLAVOR) | 1 | | SALES TIME LIMIT HAS PASSED. PLEASE EXCHANGE PRODUCT. | |
| RICE BALL (TUNA MAYONNAISE) | 1 | | | |
| DEEP-FRIED CHICKEN LUNCH | 1 | | | |

FIG. 18

PRODUCT SHAPE INFORMATION

| PRODUCT IDENTIFICATION INFORMATION | SHAPE |
|---|---|
| 123456 | RECTANGLE  (ASPECT RATIO OF 5:2) |
| . . . . . . | . . . . . . |

PRODUCT REGISTRATION APPARATUS, PRODUCT REGISTRATION METHOD, AND NON-TRANSITORY STORAGE MEDIUM

This application is a continuation of U.S. application Ser. No. 17/333,850 filed on May 28, 2021, which is a continuation of U.S. application Ser. No. 16/394,504 filed on Apr. 25, 2019, which issued as U.S. Pat. No. 11,055,660, which is based on Japanese patent application No. 2018-086827 filed on Apr. 27, 2018, the contents of which is incorporated hereinto by reference.

BACKGROUND

Technical Field

The invention relates to a product registration apparatus, a product registration method, and a program.

Related Art

Techniques for improving efficiency of registering work to register a product to be checked out in a register are being studied. Related techniques are disclosed in Japanese Patent Application Publication No. 2017-59208 and Pamphlet of International Publication No. WO2017/126253. The techniques disclosed in Japanese Patent Application Publication No. 2017-59208 and Pamphlet of International Publication No. WO2017/126253 relate to a technique of placing one or a plurality of products on a table, collectively recognizing the one or plurality of products, and registering the one or plurality of products.

In the technique described in Japanese Patent Application Publication No. 2017-59208, an image of a product placed on a table is captured with a camera, a barcode extracted from an image is analyzed, the product is recognized, and the recognized product is registered as an object to be checked out.

In the technique described in Pamphlet of International Publication No. WO2017/126253, an image of a product placed on a table is captured with a camera, the product is recognized by pattern matching based on a feature value of an appearance of the product, and the recognized product is registered as an object to be checked out. In the technique described in Pamphlet of International Publication No. WO2017/126253, a predetermined mark can be projected on a placement position of a product that can be recognized, an image illustrating the number of products that can be recognized can be projected, or a predetermined mark can be projected on an object that is detected as an object but cannot be recognized as a product.

SUMMARY

In the technique of collectively recognizing the products placed on the table and registering the products as objects to be checked out, a situation in which some or all of the products placed on the table cannot be recognized as objects to be checked out may occur. In the case of the technique described in Japanese Patent Application Publication No. 2017-59208, it is not possible for an operator to recognize existence or the like of a product that cannot be recognized as an object to be checked out.

In the case of the technique described in Pamphlet of International Publication No. WO2017/126253 in which the product is recognized by pattern matching based on the feature value of the appearance of the product, a recognition error of the product may occur. For example, the same type of products with the same content but different capacities exist, but the same type of products with different capacities may have almost the same package design. In a case of recognizing a product by pattern matching based on the feature value of the appearance of the product, there is a possibility of erroneously recognizing products of the same type but having different capacities.

An object of the invention is to provide a product registration apparatus, a product registration method, and a program capable of reducing erroneous recognition of a product and outputting existence of a product that cannot be recognized as an object to be checked out, in a technique for recognizing the product placed on a table and registering the product as the object to be checked out.

In one example embodiment, there is provided a product registration apparatus including an information acquisition unit that determines a placement position of a product having a placing table surface side to which product information is attached and acquires the product information attached to the product, and an output unit that outputs information indicating at least one of the placement position of the product from which the product information can be acquired and the placement position of the product from which the product information cannot be acquired.

In another example embodiment, there is provided a product registration apparatus including an information acquisition unit that determines the number of products placed on a placing table and acquires product information attached to the product, and an output unit that, in a case where the number of products from which the product information can be acquired does not coincide with the number of products determined by the information acquisition unit, outputs information indicating that the numbers of the products do not coincide with each other.

In still another example embodiment, there is provided a product registration method executed by a computer, the method including determining a placement position of a product having a placing table surface side to which product information is attached and acquiring the product information attached to the product, and outputting information indicating at least one of the placement position of the product from which the product information can be acquired and the placement position of the product from which the product information cannot be acquired.

In still another example embodiment, there is provided a program causing a computer to function as an information acquisition unit that determines a placement position of a product having a placing table surface side to which product information is attached and acquires the product information attached to the product, and an output unit that outputs information indicating at least one of the placement position of the product from which the product information can be acquired and the placement position of the product from which the product information cannot be acquired.

In still another example embodiment, there is provided a product registration method executed by a computer, the method including determining the number of products placed on a placing table and acquiring product information attached to the product, and in a case where the number of products from which the product information can be acquired does not coincide with the number of products determined in the step of determining of the number of products, outputting information indicating that the numbers of the products do not coincide with each other.

In still another example embodiment, there is provided a program causing a computer to function as an information acquisition unit that determines the number of products placed on a placing table and acquires the product information attached to the product, and an output unit that, in a case where the number of products from which the product information can be acquired does not coincide with the number of products determined by the information acquisition unit, outputs information indicating that the numbers of the products do not coincide with each other.

According to the invention, it is possible to reduce erroneous recognition of a product and it is possible for an operator to recognize existence of the product that cannot be recognized as an object to be checked out, in a technique for recognizing the product placed on a table and registering the product as the object to be checked out.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 6 is a diagram schematically illustrating an example of a product 101 to which a code C is attached;

FIG. 9 is a diagram schematically illustrating an example of information acquired by an information acquisition unit 11 according to the present example embodiment;

FIG. 10 is a diagram schematically illustrating an example of information output by the output unit 12 according to the present example embodiment;

4

Figure 17:
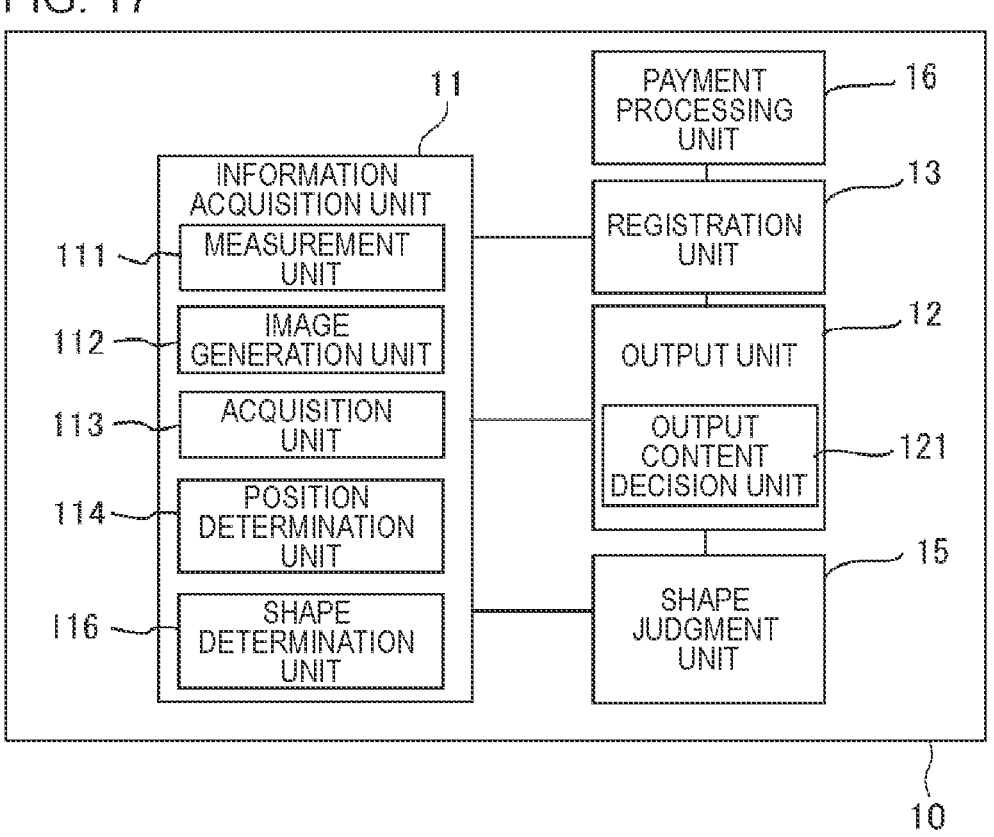
Figure 19:
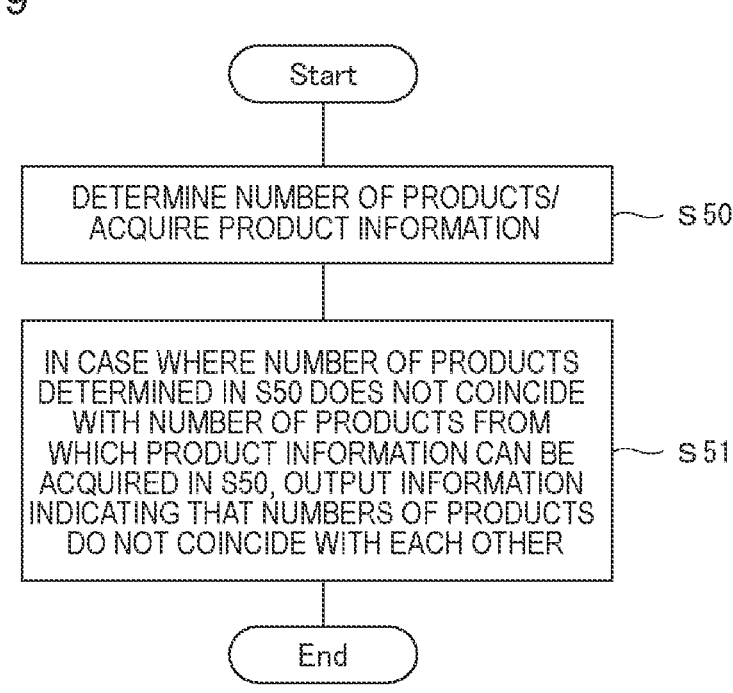
Figure 20:
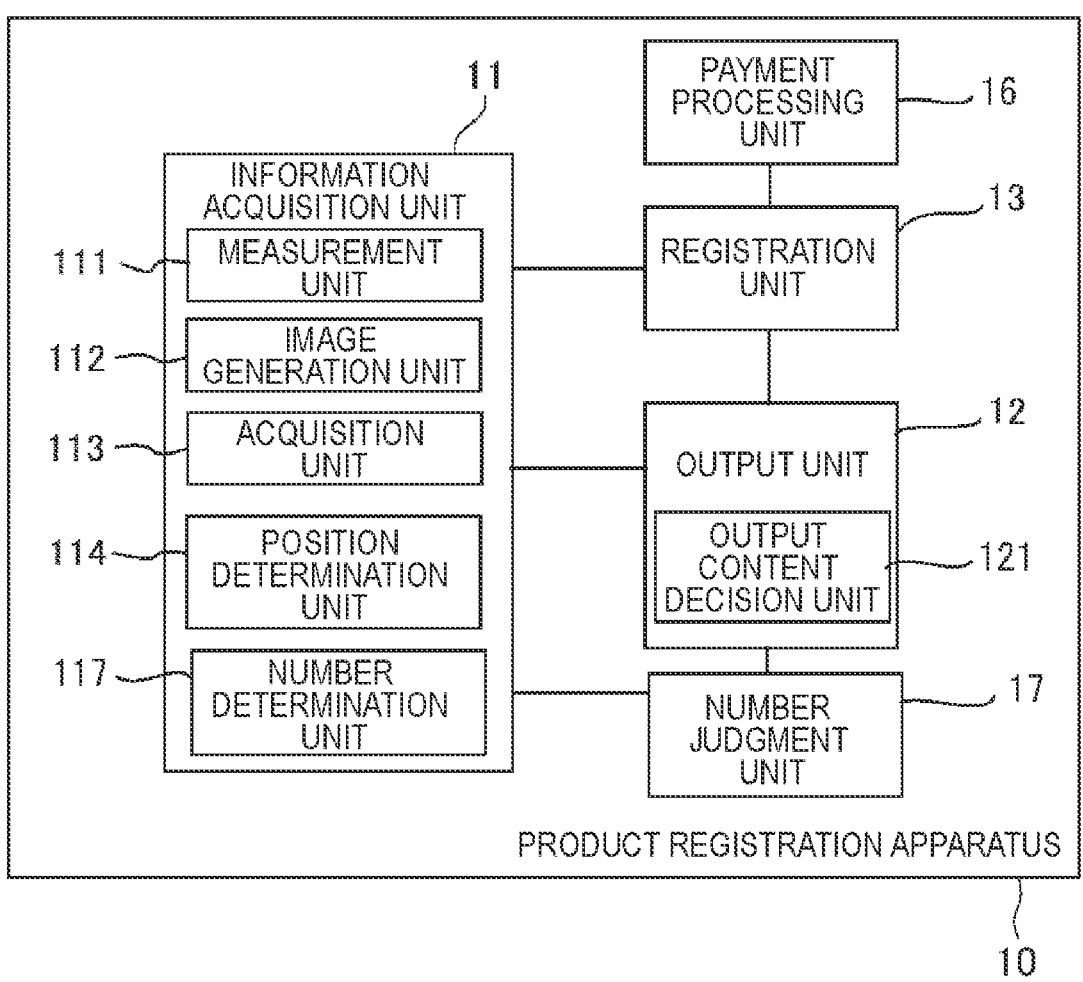

FIG. 16 is a diagram schematically illustrating another example of information output by the output unit 12 according to the present example embodiment;

FIG. 17 is a diagram illustrating another example of the functional block diagram of the product registration apparatus 10 according to the present example embodiment;

FIG. 18 is a diagram schematically illustrating an example of information processed by the product registration apparatus 10 according to the present example embodiment;

FIG. 19 is a flowchart illustrating another example of the flow of the process of the product registration apparatus 10 according to the present example embodiment; and FIG. 20 is a diagram illustrating another example of the functional block diagram of the product registration apparatus 10 according to the present example embodiment.

DETAILED DESCRIPTION

The invention will be now described herein with reference to illustrative example embodiments. Those skilled in the art will recognize that many alternative example embodiments can be accomplished using the teachings of the present invention and that the invention is not limited to the example embodiments illustrated for explanatory purposes.

First Embodiment

First, an outline of a product registration apparatus of this example embodiment will be described. In this example embodiment, product information including product identification information is attached to each product. For example, a seal on which product information is printed may be affixed to a product, or product information may be printed on a product package or the like. The product to be checked out is placed on the placing table. The product registration apparatus acquires product information from each of one or a plurality of products placed on the placing table. Further, the product registration apparatus determines a placement position of one product or each of the plurality of products placed on the placing table. Then, the product registration apparatus outputs information indicating at least one of the placement position of the product from which the product information can be acquired, and the placement position of the product from which the product information cannot be acquired.

As such, the product registration apparatus of this example embodiment, which can recognize the product to be checked out on the basis of the product information attached to each product, can reduce erroneous recognition of the product. The product registration apparatus of this example embodiment, which can output information indicating at least one of the placement position of the product from which the product information can be acquired and the placement position of the product from which the product information cannot be acquired, makes it possible for an operator to recognize existence of a product that cannot be recognized as an object to be checked out.

Figure 1:
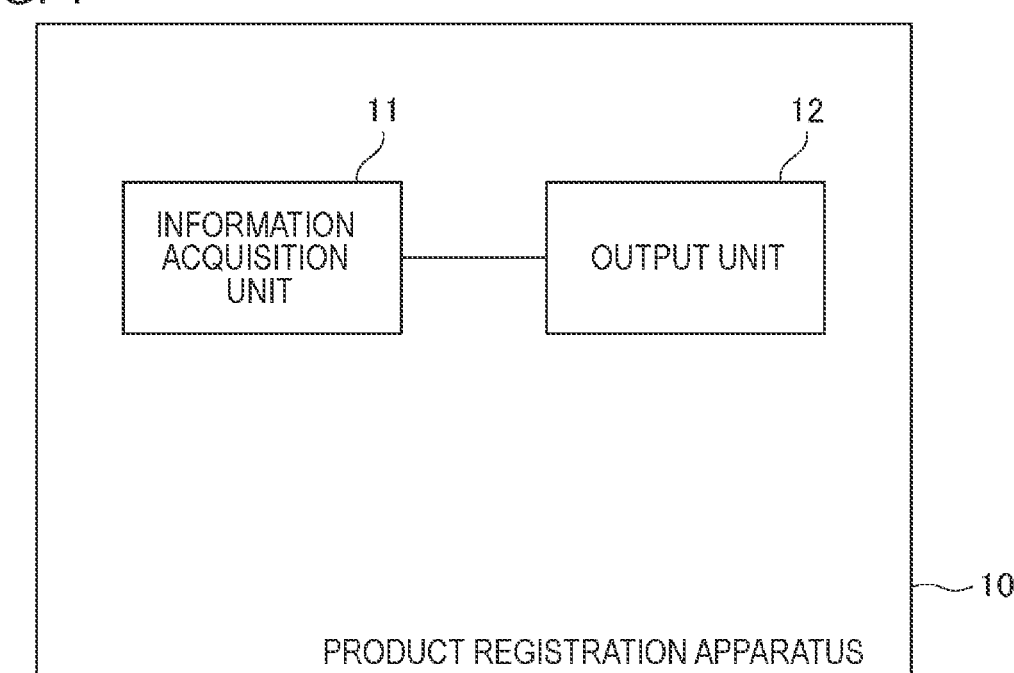
FIG. 1 is a diagram illustrating an example of a functional block diagram of a product registration apparatus 10 according to the present example embodiment.

Hereinafter, a configuration of the product registration apparatus of this example embodiment will be described in detail. FIG. 1 illustrates an example of a functional block diagram of a product registration apparatus 10. As illustrated in the figure, the product registration apparatus 10 includes an information acquisition unit 11 and an output unit 12. The product registration apparatus 10 may be realized by a plurality of apparatuses physically and/or logically separated, or may be realized by one apparatus physically and/or logically. The premise is the same in all of the following example embodiments.

Each functional unit included in the product registration apparatus 10 is realized by a central processing unit (CPU) of an arbitrary computer, a memory, a program to be loaded into the memory, a storage unit (in which programs downloaded from a storage medium such as a compact disc (CD) or a server on the Internet can also be stored, in addition to the program stored from the stage of shipping the apparatus in advance) such as a hard disk storing the program, and any combination of hardware and software centering on an interface for network connection. Those skilled in the art can understand that there are various modifications to the realization method and apparatus.

Figure 2:
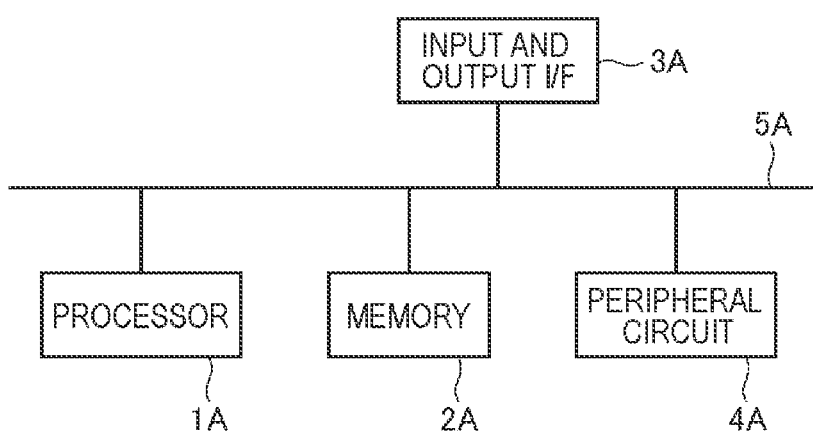
FIG. 2 is a diagram illustrating an example of a hardware configuration of the product registration apparatus 10 according to the present example embodiment.

FIG. 2 is a block diagram illustrating a hardware configuration of the product registration apparatus 10. As illustrated in FIG. 2, the product registration apparatus 10 includes a processor 1A, a memory 2A, an input and output interface 3A, a peripheral circuit 4A, and a bus 5A. The peripheral circuit 4A includes various modules. The peripheral circuit 4A may not be included. Note that, in the case where the product registration apparatus 10 is realized by a plurality of apparatuses physically and/or logically separated, each apparatus can have the hardware configuration.

The bus 5A is a data transmission path for the processor 1A, the memory 2A, the peripheral circuit 4A, and the input and output interface 3A to mutually transmit and receive data. The processor 1A is an operation processing apparatus such as a CPU or a graphics processing unit (GPU), for example. The memory 2A is a memory such as a random access memory (RAM) or a read only memory (ROM), for example. The input and output interface 3A includes an interface for acquiring information from an input apparatus, an external apparatus, an external server, an external sensor or the like, and an interface for outputting information to an output apparatus, the external apparatus, the external server, and the like. The input apparatus is, for example, a keyboard, a mouse, a microphone or the like. The output apparatus is, for example, a display, a speaker, a printer, a mailer, or the like. The processor 1A can issue an instruction to each module and perform an operation on the basis of the operation result.

Returning to FIG. 1, a functional configuration of each functional unit will be described. The information acquisition unit 11 determines the placement position of a product having the placing table surface side to which product information is attached and also acquires the product information attached to the product.

One or more products to be checked out are placed on the placing table. The "placing table surface" is the surface of the placing table on which the products are placed. The "product having the placing table surface side to which product information is attached" is a product whose product information faces the table surface. The product to which the product information is attached is placed on the placing table so that the product information faces the placing table surface. A product placed on the placing table according to the rule is a product having the placing table surface side to which product information is attached. Note that each product may be placed so that the product information is in contact with the placing table surface, or may be placed so that the product information is separated from the placing table surface.

The "product information" includes product identification information. The product identification information may be any information as long as it can identify a product, and examples are a product number, a product name, and the like. The product information may be attached to the product in a coded state such as a one-dimensional code, a two-dimensional code, or the like. In addition, product information represented by characters or the like not coded may be attached to the product. The product information is attached to an outer surface of the product. For example, a seal on which product information is printed may be affixed to the outer surface of the product, or product information may be printed on a product package or the like.

The information acquisition unit 11 can determine the placement position of one product or each of a plurality of products placed on the placing table, for example, by analyzing an image generated by capturing an image of the product from the placing table surface side. Further, the information acquisition unit 11 can acquire the product information attached to one product or each of the plurality of products by analyzing the same image.

The output unit 12 outputs information indicating at least one of a placement position on the placing table of the product from which the product information can be acquired and a placement position on the placing table of the product from which the product information cannot be acquired. The output unit 12 can output the information described above through any output apparatus such as a display, a projection apparatus, a speaker, a mailer, and the like.

Figure 3:
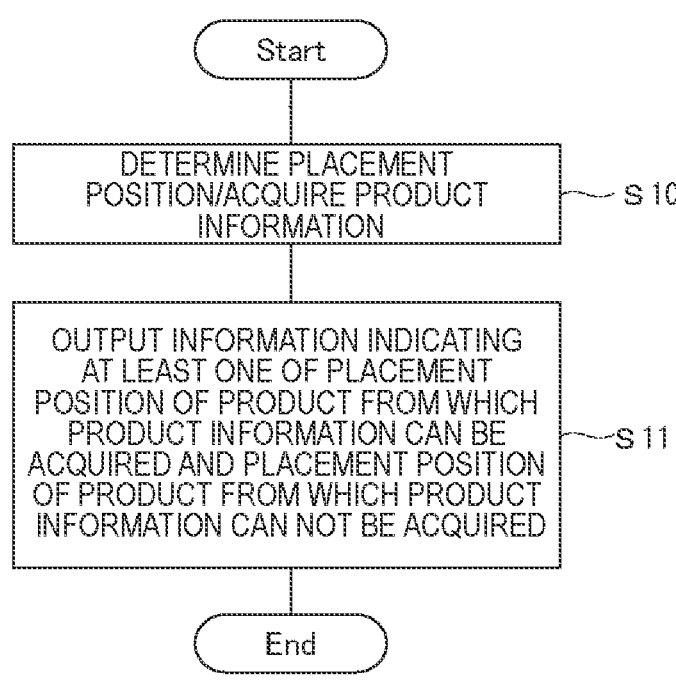
FIG. 3 is a flowchart illustrating an example of a flow of a process of the product registration apparatus 10 according to the present example embodiment.

Next, with reference to the flowchart of FIG. 3, an example of a flow of a process of the product registration apparatus 10 of this example embodiment will be described.

In S10, the information acquisition unit 11 determines the placement position of the product having the placing table surface side to which the product information is attached and acquires the product information attached to the product. In S11, the output unit 12 outputs information indicating at least one of the placement position on the placing table of the product from which the product information can be acquired, and the placement position on the placing table of the product from which the product information cannot be acquired.

As described above, the product registration apparatus 10 according to this example embodiment can recognize the product to be checked out on the basis of the product information attached to each product. Therefore, the product registration apparatus 10 of this example embodiment can reduce erroneous recognition of products. Further, the product registration apparatus 10 of this example embodiment can output information indicating at least one of the placement position on the placement table of the product from which the product information can be acquired and the placement position on the placement table of the product from which the product information cannot be acquired. Therefore, the product registration apparatus 10 according to this example embodiment can cause the operator to recognize existence of a product that cannot be recognized as an object to be checked out.

Second Embodiment

The product registration apparatus 10 of this example embodiment performs the same process as the product registration apparatus 10 of the first example embodiment, but the process content is more concrete. The product registration apparatus 10 of this example embodiment will be described below.

Figure 4:
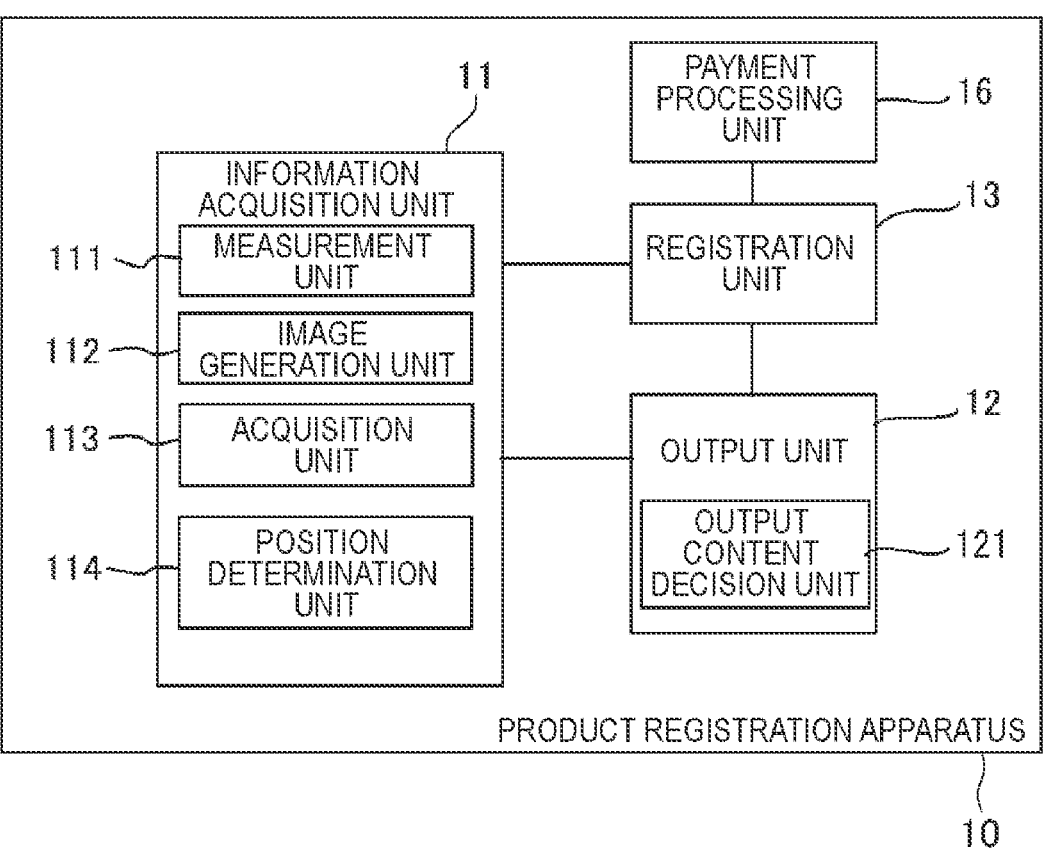
FIG. 4 is a diagram illustrating another example of the functional block diagram of the product registration apparatus 10 according to the present example embodiment.

FIG. 4 illustrates an example of a functional block diagram of the product registration apparatus 10. As illustrated in the figure, the product registration apparatus 10 includes the information acquisition unit 11, the output unit 12, the registration unit 13, and a payment processing unit 16. The information acquisition unit 11 includes a measurement unit 111, an image generation unit 112, an acquisition unit 113, and a position determination unit 114. The output unit 12 includes an output content decision unit 121.

Figure 5:
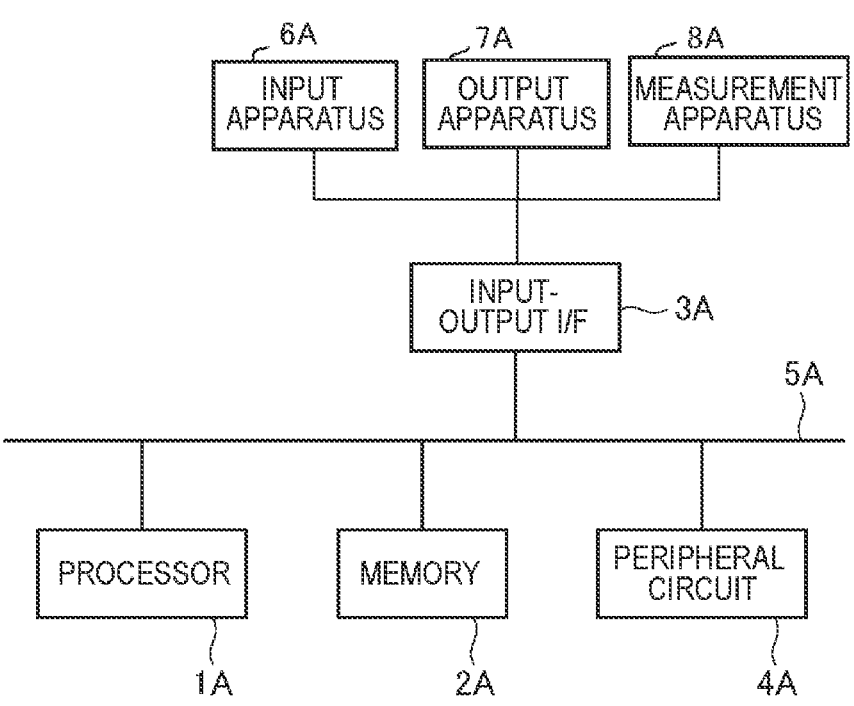
FIG. 5 is a diagram illustrating another example of the hardware configuration of the product registration apparatus 10 according to the present example embodiment.

FIG. 5 is a block diagram illustrating a hardware configuration of the product registration apparatus 10. As illustrated in FIG. 5, the product registration apparatus 10 includes the processor 1A, the memory 2A, the input and output interface 3A, the peripheral circuit 4A, the bus 5A, an input apparatus 6A, an output apparatus 7A, and a measurement apparatus 8A. The peripheral circuit 4A includes various modules. The peripheral circuit 4A may not be included.

The processor 1A, the memory 2A, the input and output interface 3A, the peripheral circuit 4A, the bus 5A, the input apparatus 6A, and the output apparatus 7A are as described in the first example embodiment.

The measurement apparatus 8A emits light and receives reflected light, and measures the time from light emission to light reception, light reception intensity, and the like. An example of such a measurement apparatus 8A is exemplified by LIDAR which emits laser light and receives reflected light. Data input from the measurement apparatus 8A is stored in the memory 2A. By executing a predetermined program, the processor 1A can generate an image using the data input from the measurement apparatus 8A and can analyze the image. The generated image is an intensity image illustrating received light intensity, a distance image illustrating the distance to the object, or the like. Further, the processor 1 can control the output apparatus connected through the input and output I/F 3A and output an operation result.

Returning to FIG. 4, a functional configuration of each functional unit will be described. The information acquisition unit 11 acquires the product information indicated by a code from the product having the placing table surface side to which the code is attached. Acquisition of the product information and the like is realized by the measurement unit 111, the image generation unit 112, the acquisition unit 113, and the position determination unit 114 illustrated in FIG. 4.

In this example embodiment, a code indicating product information is attached to each product. Although the code of this example embodiment is a two-dimensional code, the code may be a one-dimensional code or the like.

Figure 6:
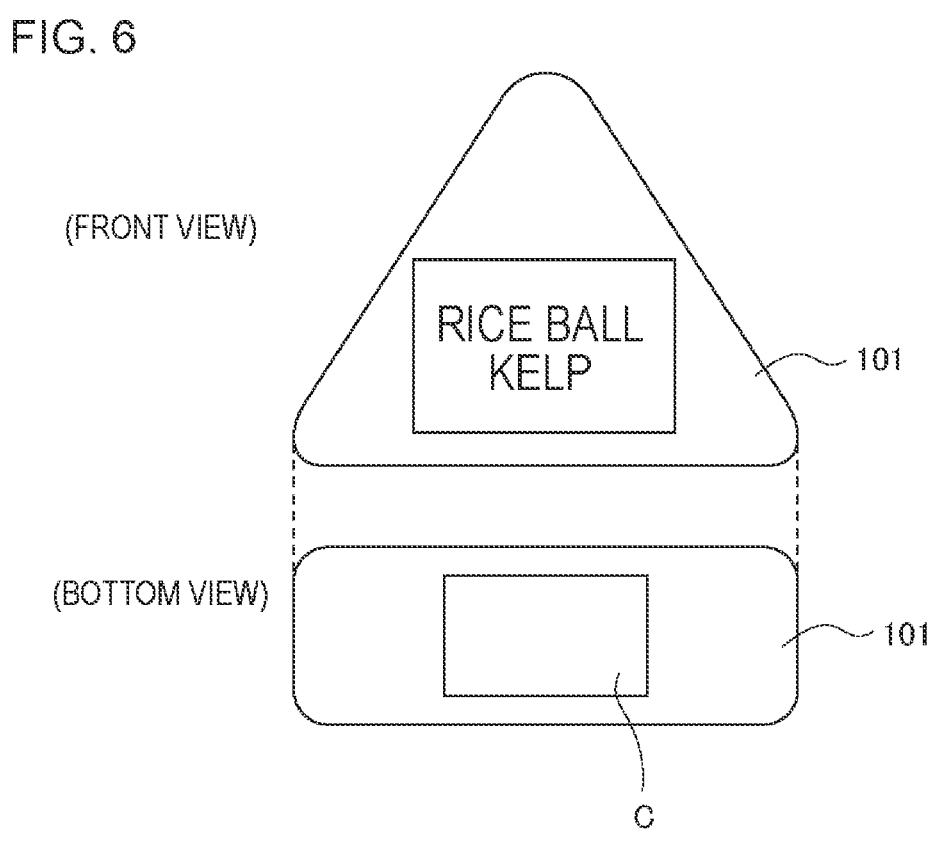

FIG. 6 illustrates an example of a product 101 to which a code C is attached. In the illustrated example, the seal on which the code C is printed is affixed to the product 101. The illustrated product 101 is a rice ball, and the cord C is attached to the bottom surface thereof. Note that the position to which the code C is attached is not limited to the bottom surface but may be other portions.

Figure 7:
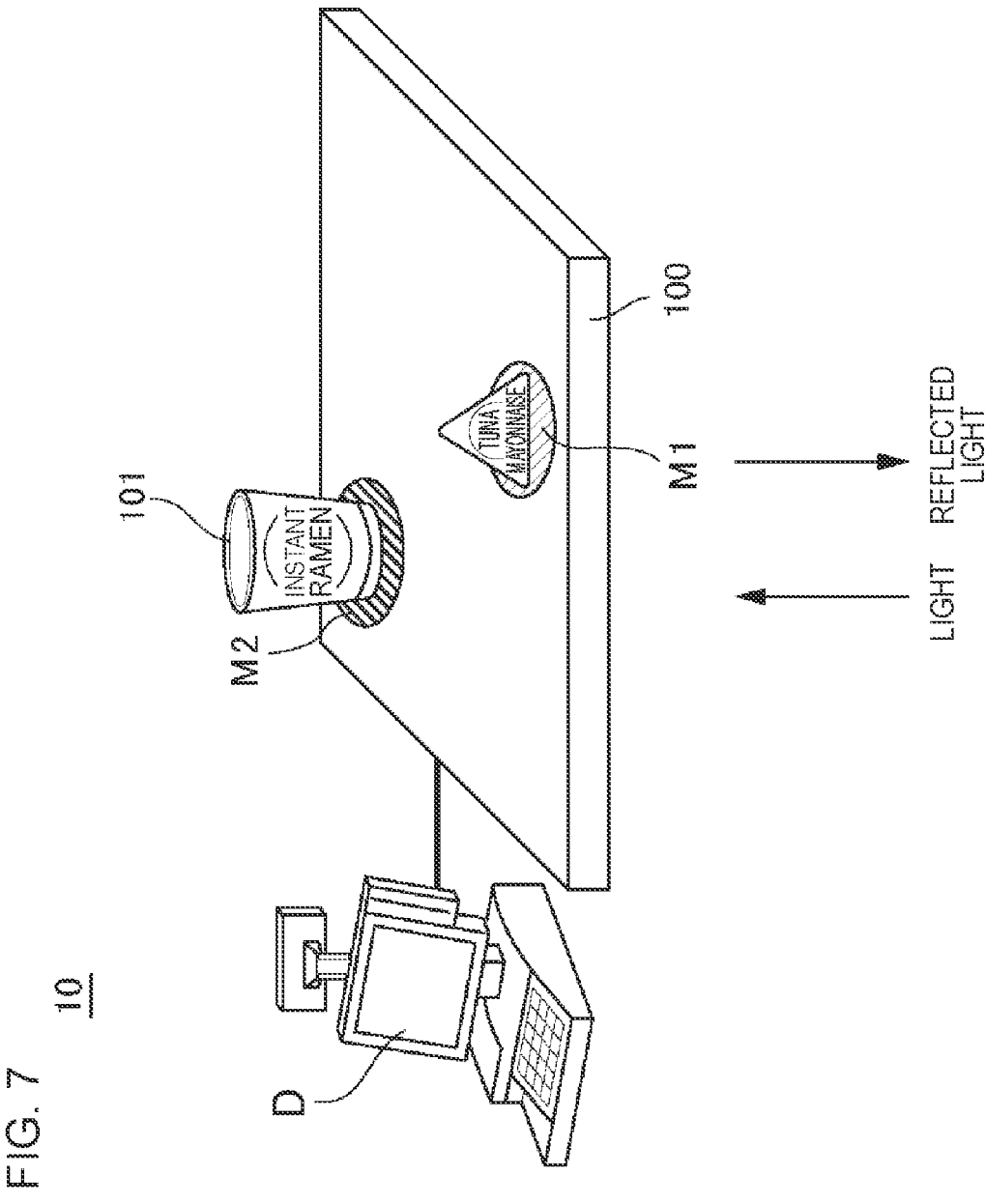
FIG. 7 is a diagram schematically illustrating an example of information displayed on a placing table 100 by an output unit 12 according to the present example embodiment.

The product 101 to be checked out is displayed on a placing table 100 as illustrated in FIG. 7. The product 101 is placed so that the cord C faces the placement surface of the placing table 100. The product 101 placed on the placing table 100 according to the rule becomes the product 101 having the placing table surface side to which the code C is attached. The part to which the code C of the product 101 is attached may be in contact with the placing table surface or may be separated from the placing table surface.

The measurement unit 111 emits light, for example, laser light towards the product 101 placed on the placing table surface, receives reflected light, and measures the time from light emission to light reception, light reception intensity, and the like. The measurement unit 111 is, for example, LIDAR.

As illustrated in FIG. 7, the measurement unit 111 emits light from the side of the surface on the side opposite to the placing table surface and receives the reflected light, thereby measuring the time from light emission to light reception, the light reception intensity, and the like. The placing table 100 is configured to transmit light emitted from at least one surface side. Specifically, the placing table 100 is configured to transmit light emitted from the side of the surface on the side opposite to the placing table surface. Therefore, as illustrated in FIG. 7, light emitted from the side of the surface on the side opposite to the placing table surface is transmitted through the placing table 100 and reaches the product 101 placed on the placing table surface. Note that the placing table 100 may be configured to transmit light emitted from the placing table surface side, or may be configured to reflect the light.

Figure 8:
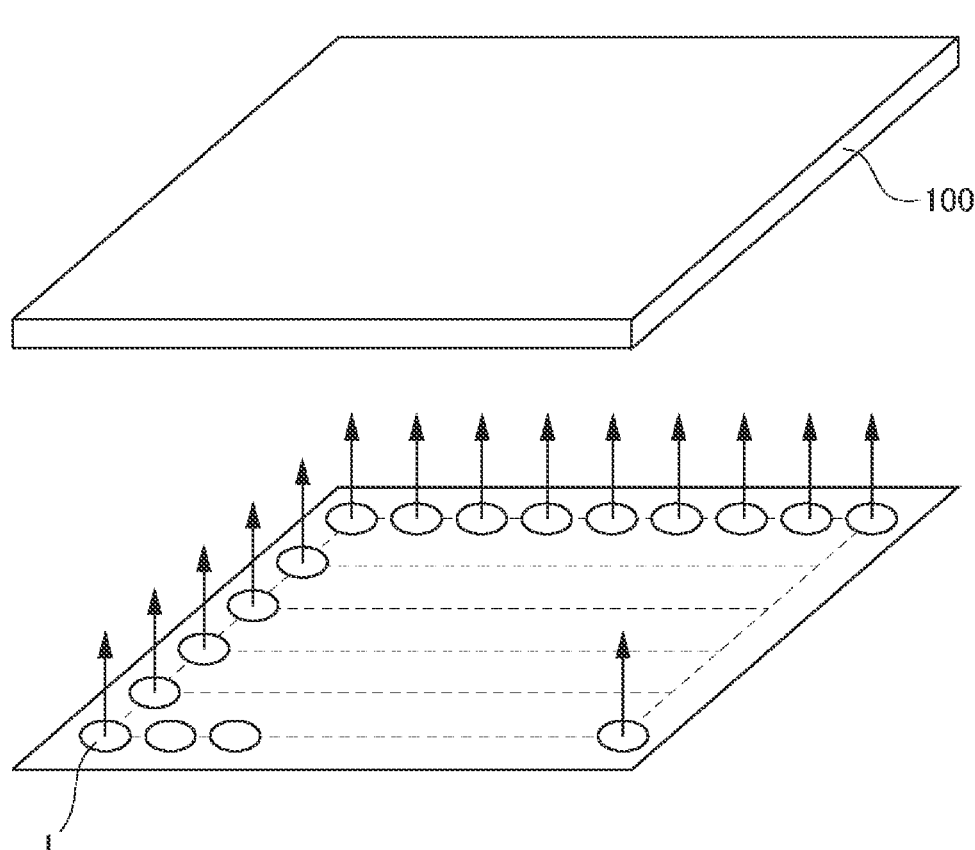
FIG. 8 is a diagram schematically illustrating an example of a light-emitting apparatus according to the present example embodiment.

For example, as illustrated in FIG. 8, a light emitting apparatus in which the light sources L are two-dimensionally arranged may be disposed parallel to the placing table 100 and the light may be emitted from the light emitting apparatus toward the placing table 100. In this way, it is possible to collect data in a desired measurement range without changing an irradiation direction of light. In a case of collecting data in a predetermined range while changing the irradiation direction of light, as the distance from the light source L increases, an interval between measured point group increases and accuracy of the measurement data deteriorates. With the configuration illustrated in FIG. 8, the interval between of the measured point group depends on the interval between the light sources L and does not depend on the distance from the light source L. As a result, highly accurate measurement data can be collected by sufficiently reducing the interval between the light sources L. Note that, although accuracy of the measurement data deteriorates, it is also possible to adopt a configuration that measures while changing the irradiation direction of light.

The image generation unit 112 generates an image on the basis of measurement data generated by the measurement unit 111. The measurement data indicates the time from light emission to light reception, received light intensity, and the like. On the basis of such measurement data, the image generation unit 112 generates an intensity image indicating intensity of received light, a distance image indicating a distance to the object, and the like. The intensity image may be, for example, an image in which values of the received light intensity are normalized to values of a plurality of stages and illustrated in gray scale.

As described above, the placing table 100 is configured to transmit light emitted from the side of the surface on the side opposite to the placing table surface. Then, the product 101 is placed so that the cord C faces the placing table surface. Therefore, the generated image includes the surface to which the code C of each product 101 is attached. In the intensity image, a pattern of the code C is illustrated.

The acquisition unit 113 analyzes the generated image and acquires the product information of each product 101. The acquisition unit 113 performs a process of detecting the product 101 in the image, a process of detecting the code C in the image, and a process of analyzing the pattern of the code C and acquiring the product information.

First, the acquisition unit 113 performs the process of detecting the product 101 in the image. The image to be analyzed in the process may be an intensity image or a distance image. For example, the acquisition unit 113 performs contour extraction processing on the image or a process of extracting a contour that satisfies a shape condition or size condition from among the extracted contours, thereby detecting one or a plurality of products 101 included in the image.

After detecting the product 101 in the image, the acquisition unit 113 performs a process of detecting the code C in the image and a process of analyzing the pattern of the code C and acquiring the product information. The image to be analyzed in the process is an intensity image. For example, the acquisition unit 113 detects the code C from an area in the image where the product 101 exists by using a pattern matching technique or the like. Thereafter, the acquisition unit 113 analyzes the pattern of the detected code C and converts the pattern into information, thereby acquiring the product information of each product 101 indicated by the code C.

The position determination unit 114 acquires position information indicating the position of each product 101 detected by the acquisition unit 113. The position information is a coordinate in a two-dimensional coordinate system with an arbitrary point in the image as the origin and arbitrary directions as the x-axis and the y-axis, and indicates the position of each product 101. For example, the coordinates of the representative point in an area in the image where each product 101 exists can be set as the position information of each product 101.

Through the process by the information acquisition unit 11, an image analysis result as illustrated in FIG. 9 is generated. In the image analysis result, the position information of one product 101 or each of the plurality of products 101 detected in the process of detecting the product 101 is associated with the product information acquired from each product 101. Note that, in the product 101 from which the product information cannot be acquired due to various reasons such as being unable to detect the code C in the image, not being able to convert the pattern of the code C into information, or the like although the product was detected as the product 101 in the image, only the position information is registered and the product information is not registered.

The registration unit 13 registers the product 101 determined by product identification information included in the product information acquired by the information acquisition unit 11 as an object to be checked out. For example, the registration unit 13 acquires information associated with the product identification information from a product master that stores a price, a product name, and the like of each product 101. Then, the registration unit 13 registers the acquired information as checkout-related information. Hereinafter, the price, product name, and the like of each product 101 registered in the product master are referred to as product master information.

The output content decision unit 121 of the output unit 12 decides the output content. Then, the output unit 12 displays the information determined by the output content decision unit 121 on the placing table 100.

The output unit 12 can display predetermined information on the placing table 100 by using a projection apparatus. In this case, the placing table 100 has a semi-transmissive property that reflects light emitted from the placing table surface side and transmits light emitted from the side of the surface on the side opposite to the placing table surface. This configuration can be realized by using, for example, a technique such as a display which transmits back light and reflects external light. The projection apparatus emits light from the placing table surface side.

In FIG. 7, an example of a state where the output unit 12 displays predetermined information on the placing table 100 is illustrated. In the example illustrated in FIG. 7, the output unit 12 displays a mark M1 at the placement position of the product 101 from which the product information was acquired, displays a mark M2 at the placement position of the product 101 from which the product information cannot be acquired. Marks M1 and M2 have different display modes such as color, shape, shading and the like.

It should be noted that information to be displayed may be other information such as a character, number, symbol, and the like. In the illustrated example, the output unit 12 displays information so as to include the placement position of the product 101, but the output unit 12 may display information in the vicinity of the placement position.

The output unit 12 holds a conversion rule for converting the "coordinates of the image" into the "coordinates of a projection area of the projection apparatus" in advance. Then, the output unit 12 converts the coordinates of the product 101 in the image into the coordinates of the projection area of the projection apparatus on the basis of the conversion rule, and displays information, for example, so as to surround the converted position or in proximity to the position.

The coordinates of the image are indicated in a coordinate system in which an arbitrary position in the image is set as the origin and arbitrary directions are set as the x-axis direction and the y-axis direction. The coordinates of the projection area of the projection apparatus are indicated by a coordinate system in which an arbitrary position in the projection area is set as the origin and arbitrary directions are set as the x-axis direction and the y-axis direction.

The output unit 12 can display a list of the products 101 registered as objects to be checked out on a display of the product registration apparatus 10, for example, a display D illustrated in FIG. 7. In FIG. 10, an example of the information is schematically illustrated. In the illustrated example, the output unit 12 displays a name and a quantity of the product 101 registered as the object to be checked out. Further, the output unit 12 displays an image of the product 101 determined by the product information acquired by the information acquisition unit 11. The product registration apparatus 10 stores an image of each product 101 in advance in association with each piece of the product identification information. Then, the output unit 12 reads the image corresponding to the product identification information included in the product information acquired by the information acquisition unit 11, and performs image display illustrated in FIG. 10. By displaying the image of each product 101 in this way, the operator and the customer can intuitively recognize whether or not correct information is registered. Note that other information such as a sales price of each product 101 may be displayed on the display of the product registration apparatus 10.

When an input to start a payment process is received, the payment processing unit 16 performs the payment process. For example, the payment processing unit 16 can execute at least some of a process of receiving input of cash, a process of receiving input of a deposit amount, a process of computing change, a process of outputting change, a process of outputting a receipt, a process of receiving input of credit card information, a payment process in cooperation with a credit company's system, and a process of transmitting information for the payment process, for example, information indicating the registered product 101, total payment amount, and the like to another payment apparatus.

Figure 11:
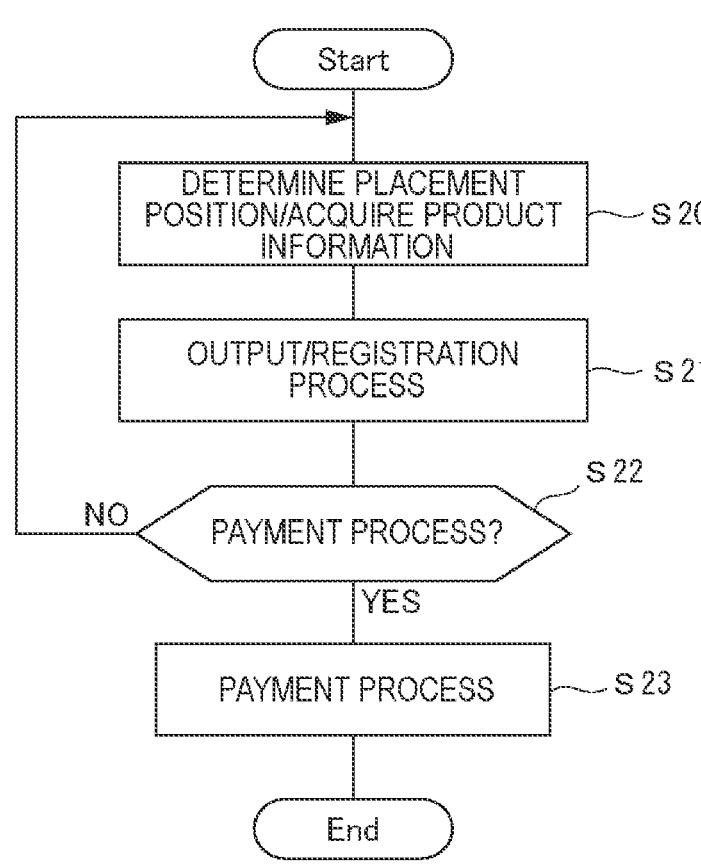
FIG. 11 is a flowchart illustrating another example of the flow of the process of the product registration apparatus 10 according to the present example embodiment.

Next, with reference to the flowchart of FIG. 11, an example of a flow of a process of the product registration apparatus 10 of this example embodiment will be described.

In S20, the information acquisition unit 11 determines the placement position of the product 101 having the placing table surface side to which the product information is attached, and also acquires the product information attached to the product 101.

Figure 12:
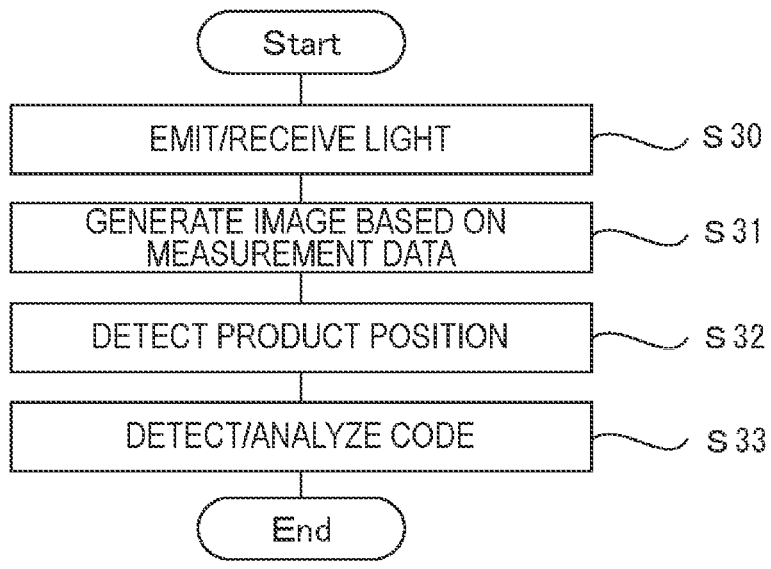
FIG. 12 is a flowchart illustrating another example of the flow of the process of the product registration apparatus 10 according to the example embodiment.

Specifically, the information acquisition unit 11 performs the process illustrated in FIG. 12. In S30, the measurement unit 111 emits light, for example, a laser toward the placing table 100 on which the product 101 to be checked out is placed, receives reflected light, and measures the time from light emission to light reception, received light intensity, and the like. In S31, the image generation unit 112 generates an image on the basis of measurement data of S30. The image generation unit 112 generates an intensity image indicating intensity of received light, a distance image indicating a distance to an object, and the like.

In S32, the acquisition unit 113 analyzes the image generated in S31 and detects the product 101 included in the image. In a case where a plurality of products 101 exist in the image, each of the plurality of products 101 is detected. For example, one or a plurality of products 101 included in the image are detected by performing contour extraction processing or a process of extracting contours satisfying the conditions of the shape and the size from among the extracted contours. Thereafter, the position determination unit 114 acquires position information indicating the placement position of the product 101 detected by the acquisition unit 113. The position information is the coordinates in a two-dimensional coordinate system with an arbitrary point in the image as the origin and arbitrary directions as the x-axis and the y-axis, and indicates the position of each product 101. For example, the coordinates of the representative point in the area in the image where each product 101 is present can be the position information of each product 101.

In S33, the acquisition unit 113 analyzes the image generated in S31 and detects the code C in the image. For example, the acquisition unit 113 detects the code C from the area in the image where the product 101 exists by using a pattern matching technique or the like. Thereafter, the acquisition unit 113 analyzes the pattern of the detected code C and converts the pattern into information, thereby acquiring the product information of each product 101 indicated by the code C. When a plurality of codes C exist in the image, the acquisition unit 113 detects a plurality of codes, analyzes each of the plurality of codes, and converts each code into product information.

Through the process of S30 to S33, the image analysis result as illustrated in FIG. 9 is generated. In the image analysis result, the position information of one product 101 or each of the plurality of products 101 detected in S32 and the product information acquired from each product 101 in S33 are associated with each other. Note that, in the product 101 from which the product information cannot be acquired due to various reasons such as being unable to detect the code C in the image, not being able to convert the pattern of the code C into information, or the like although the product was detected as the product 101 in the image, only the position information is registered and the product information is not registered.

Returning to FIG. 11, in S21, a process according to the process result of S20 is executed. First, the registration unit 13 acquires product master information associated with the product identification information acquired in S20 from the product master and registers the product master information as the object to be checked out. The output unit 12 displays information indicating at least one of the placement position of the product 101 from which the product information can be acquired and the placement position of the product 101 from which the product information cannot be acquired on the placing table 100. Furthermore, the output unit 12 can display a list of the products 101 registered as the objects to be checked out on the display.

After S21, when the payment processing unit 16 does not receive an input to start the payment process (No in S22), the information acquisition unit 11 executes S20 with the newly generated image as a processing target. Note that the information acquisition unit 11 can discriminate between the product 101 newly placed on the placing table 100 and the product 101 that is placed on the placing table 100 on the basis of, for example, a time-series change of the image. Then, when it is detected that the new product 101 is placed on the placing table 100, the registration unit 13 newly registers the product 101 as an object to be checked out in S21.

When the payment processing unit 16 receives an input to start the payment process (Yes in S22), the payment processing unit 16 performs the payment process. For example, the payment processing unit 16 may receive input of cash or a deposit amount, compute change, and output the change. Otherwise, the payment processing unit 16 may receive input of credit card information and perform a settlement process in cooperation with a credit company's system. Otherwise, the payment processing unit 16 may transmit information for payment process, for example, information indicating the registered product 101 and the total payment amount to another payment apparatus.

Figure 13:
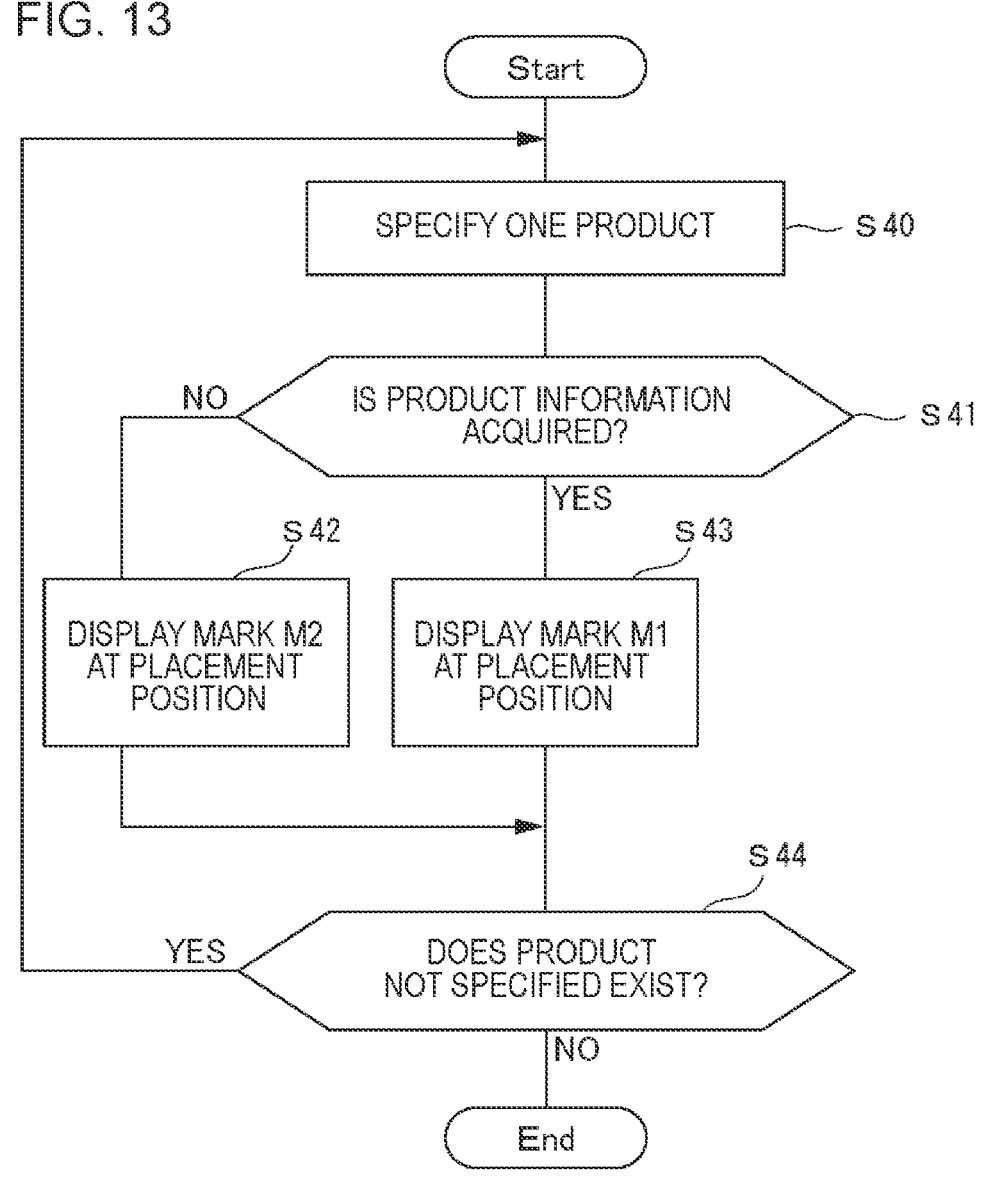
FIG. 13 is a flowchart illustrating another example of the flow of the process of the product registration apparatus 10 according to the present example embodiment.

Next, with reference to a flowchart of FIG. 13, an example of a flow of a process in which the output content decision unit 121 determines output content will be described. Note that the process is only an example and is not limited thereto.

The output content decision unit 121 specifies one of the products 101 whose position is detected in S32 (S40). For example, in the image analysis result illustrated in FIG. 9, the output content decision unit 121 specifies one serial number in which the position information is registered. Then, in a case where the product information of the specified product 101 can be acquired (Yes in S41), that is, in a case where the product information is registered in association with the serial number specified in the image analysis result illustrated in FIG. 9, the output content decision unit 121 decides to display the mark M1 at the placement position of the product 101 (S43).

On the other hand, in a case where the product information of the specified product 101 cannot be acquired (No in S41), that is, in a case where the product information is not registered in association with the serial number specified in the image analysis result illustrated in FIG. 9, the output content decision unit 121 decides to display the mark M2 at the placement position of the product 101 (S42).

The marks M1 and M2 have different display modes such as color, shape, shading and the like, and are discriminable from each other.

In S44, it is confirmed whether or not the product 101 which is not specified in S40 exists among the products 101 whose position is detected in S32. In a case where the product 101 which is not specified in S40 exists (Yes in S44), the process returns to S40 and the process is repeated. In a case where the product 101 which is not specified in S40 does not exist (No in S44), the process is ended.

The product registration apparatus 10 of this example embodiment described as above can realize the same advantageous effects as those of the first example embodiment.

In addition, the operator who performs the registration work only has to place the product 101 to be checked out on the placing table 100 so that the product information faces the placing table surface, and can avoid troublesome work such as reading a bar code individually with a code reader. As a result, the registration work becomes more efficient.

Since the product registration apparatus 10 of this example embodiment acquires product information by image analysis, it is possible to collectively process a plurality of products 101 included in the image. Therefore, work efficiency is improved.

Further, the product registration apparatus 10 of this example embodiment acquires product information from the product 101 having the placing table surface side to which the product information is attached. Specifically, as illustrated in FIG. 7, the measurement apparatus 8A emits light from the side of the surface on the side opposite to the placing table surface towards the product 101 having the placing table surface side to which the product information is attached and reflects the reflected light, thereby measuring the time from light emission to light reception, received light intensity, and the like.

In a case where the product is placed so that the product information faces the placing table surface, the position of the product information of each of the plurality of products 101 gathers in the vicinity of the placing table surface without being affected by variations in the height of the product 101 or the like. In a case where the plurality of products 101 are placed so that the product information is in contact with the table surface, the position of the product information of each of the plurality of products 101 fall within a narrower range.

In such a case, the distance between the measurement apparatus 8A and the product information on each product 101 is within a certain small range without being affected by variations in the height of the product 101 or the like. As a result, it becomes easy to collectively read the codes attached to the plurality of products 101.

Third Embodiment

The product registration apparatus 10 of this example embodiment is different from the first and second example embodiments in that the product registration apparatus 10 has a function of determining a sales time limit of each product 101 on the basis of the product information acquired from each product 101 to be checked out and notifying in a case where the sales time limit has passed, in addition to the configuration of the product registration apparatus 10 of the first and second example embodiments. Hereinafter, description will be made.

The hardware configuration of the product registration apparatus 10 is the same as that of the first and second example embodiments.

Figure 14:
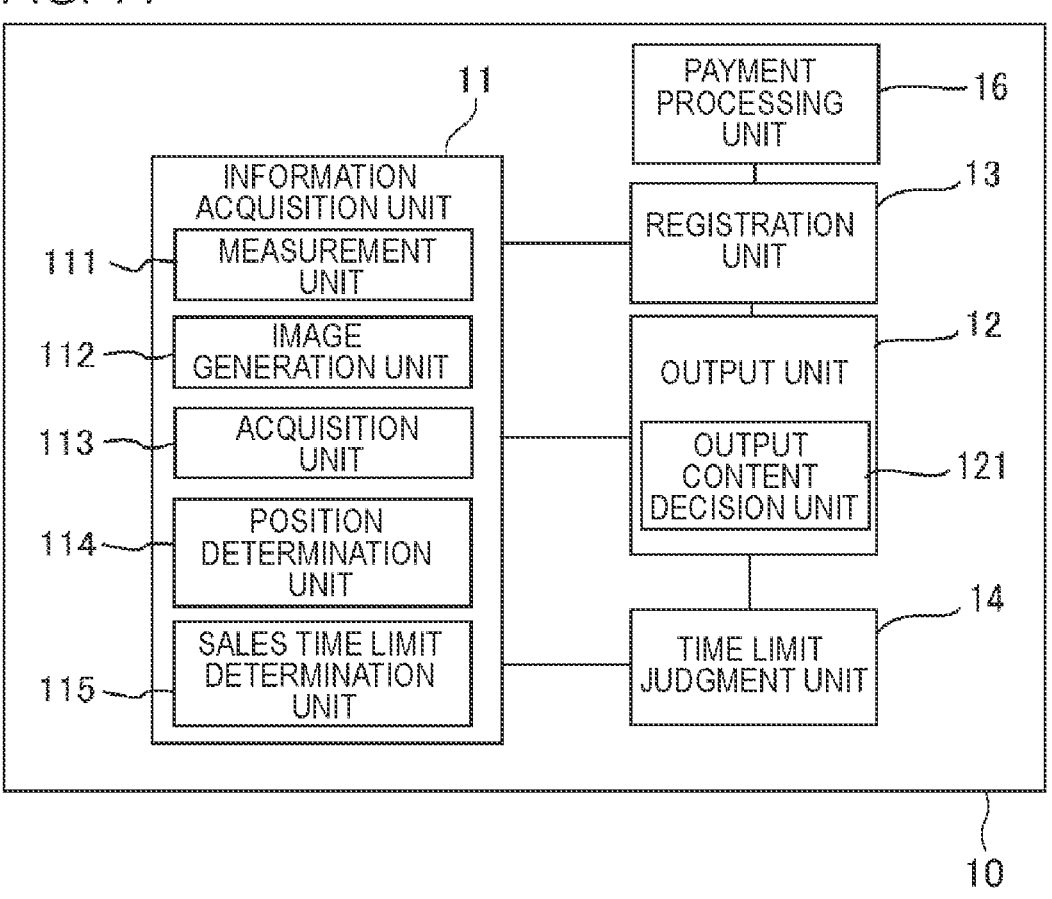
FIG. 14 is a diagram illustrating another example of the functional block diagram of the product registration apparatus 10 according to the present example embodiment.

In FIG. 14, an example of a functional block diagram of the product registration apparatus 10 is illustrated. As illustrated in the figure, the product registration apparatus 10 includes the information acquisition unit 11, the output unit 12, the registration unit 13, a time limit judgment unit 14, and the payment process unit 16. The information acquisition unit 11 includes the measurement unit 111, the image generation unit 112, the acquisition unit 113, the position determination unit 114, and sales time limit determination unit 115. The output unit 12 has the output content decision unit 121.

The configurations of the measurement unit 111, the image generation unit 112, the acquisition unit 113, the position determination unit 114, the registration unit 13 and the payment processing unit 16 are as described in the example embodiments.

The sales time limit determination unit 115 determines the sales time limit of each product 101 on the basis of the product information. The product information of this example embodiment includes information for determining a best-before date and a consumption expiration date. For example, the product information may include the best-before date or the consumption expiration date itself. In addition, the product information may include a lot number and serial number of each product 101. In this case, the sales time limit determination unit 115 can acquire the best-before date and the consumption expiration date corresponding to the acquired lot number or serial number from a management server managing the best-before date and the consumption expiration date of each product 101 for each lot number and serial number.

The sales time limit determination unit 115 determines the sales time limit of each product 101 on the basis of the best-before date and the consumption expiration date of each product 101 determined by the unit as described above. The sales time limit may be the best-before date and the consumption expiration date, or may be a time earlier by a predetermined time period T than the best-before date and the consumption expiration date.

It should be noted that the predetermined time T may be determined for each product 101. For example, the predetermined time T may be determined in such a way that "a sales time limit of a product A may be a time earlier by three hours than the best-before date or the consumption expiration date", and "a sales time limit of a product B may be a time earlier by five hours than the best-before date or the consumption expiration date" or the like. In this case, registration information, in which the predetermined time T is registered for each product 101, is generated in advance and is registered in the product registration apparatus 10 or the external apparatus which is configured to be communicable with the product registration apparatus 10. Then, the sales time limit determination unit 115 can acquire the predetermined time T of each product 101 from the registration information, and can determine the sales time limit of each product 101 on the basis of the information.

The time limit judgment unit 14 judges whether or not the sales time limit of each product 101 has passed. The time limit judgment unit 14 compares the current date and time with the sales time limit of each product 101 determined by the sales time limit determination unit 115, thereby judging whether or not the sales time limit of each product 101 has passed.

The output unit 12 makes notification of the product 101 whose sales time limit has passed. For example, the output content decision unit 121 may decide to display a mark M3 at the placement position of the product 101 whose sales time limit has passed. The marks M1 to M3 have different display modes such as color, shape, shading and the like, and are distinguishable from each other. Note that information to be displayed may be other information such as characters, numbers, symbols, and the like.

Figure 15:
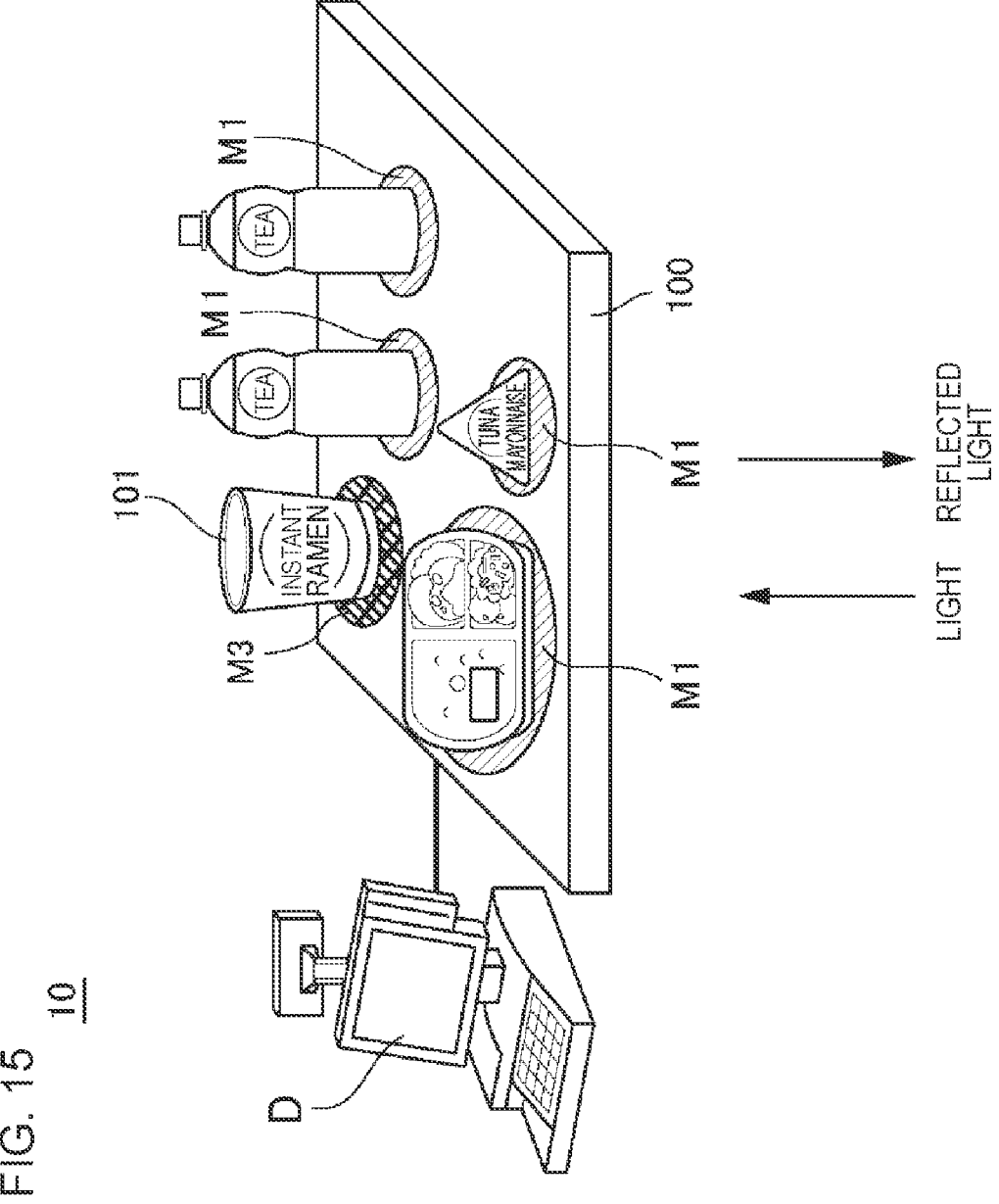
FIG. 15 is a diagram schematically illustrating another example of information displayed on the placing table 100 by the output unit 12 according to the present example embodiment.

In FIG. 15, an example in which the mark M3 is displayed on the placing table 100 is illustrated. In the example illustrated in FIG. 15, the output unit 12 displays the mark M1 at the placement position of the product 101 of which the sales time limit has not passed among the products 101 from which the product information can be acquired. Then, the output unit 12 displays the mark M3 at the placement position of the product 101 whose sales time limit has passed among the products 101 from which the product information can be acquired.

Further, the output unit 12 may use the display of the product registration apparatus 10, for example, the display D illustrated in FIG. 15, to make notification of the product 101 whose sales time limit has passed. In FIG. 16, an example of information displayed on the display D of the product registration apparatus 10 by the output unit 12 is schematically illustrated. In the illustrated example, the name, the quantity, and the product image of the product 101 registered as the object to be checked out are displayed. In the field of "judgment", a result of judgment as to whether or not the sales time limit of each product 101 has passed is indicated. In the example illustrated in the figure, it is understood that the sales time limit of a ramen A has passed and the sales time limit of the other products 101 has not passed.

Other configurations of the information acquisition unit 11 and the output unit 12 are the same as those described in the example embodiments described above.

The product registration apparatus 10 of this example embodiment can realize the same advantageous effects as those of the first and second example embodiments. Further, at the stage of checkout, the product registration apparatus 10 of this example embodiment can check whether the sales time limit of the product 101 to be checked out has not passed. As a result, it is possible to avoid inconveniences of selling the product 101 whose sales time limit has passed.

Fourth Embodiment

The product registration apparatus 10 of this example embodiment is different from the first to third example embodiments in that the product registration apparatus 10 determines a shape of the product 101 placed on the placing table 100 and outputs information indicating whether or not the determined shape matches the product information acquired by the information acquisition unit 11. Hereinafter, description will be made.

The hardware configuration of the product registration apparatus 10 is the same as that of the first to third example embodiments.

In FIG. 17, an example of a functional block diagram of the product registration apparatus 10 is illustrated. As illustrated in the figure, the product registration apparatus 10 includes the information acquisition unit 11, the output unit 12, the registration unit 13, a shape judgment unit 15, and the payment processing unit 16. The information acquisition unit 11 includes the measurement unit 111, the image generation unit 112, the acquisition unit 113, the position determination unit 114, and shape determination unit 116. The output unit 12 has the output content decision unit 121.

Note that the product registration apparatus 10 may further include a time limit judgment unit 14. The information acquisition unit 11 may further include a sales time limit determination unit 115.

The configurations of the measurement unit 111, the image generation unit 112, the acquisition unit 113, the position determination unit 114, the sales time limit determination unit 115, the registration unit 13, the time limit judgment unit 14, and the payment processing unit 16 are as described in the example embodiments described above.

The shape determination unit 116 analyzes the image generated by the image generation unit 112 and determines the shape of the product 101 included in the image. For example, the shape determination unit 116 may determine a shape of a surface of the product 101 facing the placing table surface.

The shape judgment unit 15 holds product shape information indicating the shape of each product 101 as illustrated in FIG. 18 in advance. In the product shape information, for example, the shape of the surface to which the product information of each product 101 is attached may be indicated. When the acquisition unit 113 acquires the product information from each product 101, the shape judgment unit 15 extracts the shape registered in association with the product identification information included in the product information from the product shape information. Next, the shape judgment unit 15 determines whether or not the shape extracted from the product shape information matches the shape of the product 101 determined by the shape determination unit 116.

The term of "match" may include completely matching and slightly different. For example, in a case where the shape of the product 101 indicated by the product shape information is a "rectangle having an aspect ratio of 5:2", it may be judged that the shapes match with each other in a case where the shape of the product 101 determined by the shape determination unit 116 is a rectangle having an aspect ratio of A:B (note that, $5-\alpha \leq A \leq 5+\alpha$, $2-\beta \leq B \leq 2+\beta$).

The output unit 12 outputs the judgment result obtained by the shape judgment unit 15. That is, the output unit 12 outputs information indicating whether or not the shape of the product 101 determined by the shape determination unit 116 matches the shape of the product 101 determined on the basis of the product information acquired from each product 101.

Other configurations of the information acquisition unit 11 and the output unit 12 are the same as those described in the example embodiments described above.

The product registration apparatus 10 of this example embodiment can realize the same advantageous effects as those of the first to third example embodiments. Further, the product registration apparatus 10 of this example embodiment can detect mismatching between product information attached to each product 101 and each product 101. As a result, it is possible to detect a case where an erroneous code C is attached to the product 101. It is also possible to check whether or not appropriate product information corresponding to each product 101 is acquired from each product 101.

Fifth Embodiment

First, an outline of the product registration apparatus 10 of this example embodiment will be described. The product registration apparatus 10 of this example embodiment acquires product information from one product 101 or each of a plurality of products 101 placed on the placing table 100. The product registration apparatus 10 determines the number of products 101 placed on the placing table 100. In a case where the number of the products 101 placed on the placing table 100 does not coincide with the number of the products 101 from which the product information can be acquired, the product registration apparatus 10 outputs information indicating that the numbers of the products 101 do not coincide with each other.

As described above, the product registration apparatus 10 of this example embodiment, which can recognize the product 101 to be checked out on the basis of the product information attached to each product 101, can reduce erroneous recognition of the product 101. The product registration apparatus 10 of this example embodiment that can output information indicating that the number of products 101 placed on the placing table 100 does not coincide with the number of products 101 from which product information can be acquired can cause the operator to recognize existence of the product 101 that cannot be recognized as the object to be checked out.

Hereinafter, the configuration of the product registration apparatus 10 of this example embodiment will be described in detail. A hardware configuration of the product registration apparatus 10 is the same as that of the first example embodiment.

In FIG. 1, an example of a functional block diagram of the product registration apparatus 10 is illustrated. As illustrated in the figure, the product registration apparatus 10 includes the information acquisition unit 11 and the output unit 12.

The information acquisition unit 11 determines the number of products 101 placed on the placing table 100 and acquires the product information attached to the product 101. The information acquisition unit 11 can determine the number of products 101 placed on the placing table 100, for example, by analyzing an image generated by capturing an image of the product 101. In addition, the information acquisition unit 11 can acquire the product information attached to each product 101 by analyzing the same image.

In a case where the number of products 101 from which product information can be acquired does not coincide with the number of products 101 determined by the information acquisition unit 11, the output unit 12 outputs information indicating that the numbers of the products 101 do not coincide with each other. The output unit 12 can output the information through any output apparatus such as a display, a projection apparatus, a speaker, a mailer, or the like. Note that the determination as to whether or not the number of products 101 from which the product information can be acquired coincides with the number of products 101 determined by the information acquisition unit 11 may be performed by the product registration apparatus 10 or may be performed by an external apparatus configured to be able to communicate with the product registration apparatus 10.

Next, an example of a flow of a process of the product registration apparatus 10 of this example embodiment will be described with reference to a flowchart of FIG. 19.

In S50, the information acquisition unit 11 determines the number of products 101 placed on the placing table 100 and acquires the product information attached to the product 101. In S51, in a case where the number of products 101 from which product information can be acquired does not coincide with the number of products 101 determined by the information acquisition unit 11, the output unit 12 outputs information indicating that the numbers of the products 101 do not coincide with each other.

As described above, the product registration apparatus 10 of this example embodiment can recognize the product 101 to be checked out on the basis of the product information attached to each product 101. Such a product registration apparatus 10 of this example embodiment can reduce erroneous recognition of the product 101. In a case where the number of products 101 from which product information can be acquired does not coincide with the number of products 101 determined by the information acquisition unit 11, for example, by image analysis, the product registration apparatus 10 of this example embodiment can output information indicating that the numbers of the products 101 do not coincide with each other. Such a product registration apparatus 10 of this example embodiment can cause the operator to recognize existence of the product 101 that cannot be recognized as the object to be checked out.

Sixth Embodiment

The product registration apparatus 10 of this example embodiment performs the same process as the product registration apparatus 10 of the fifth example embodiment, but the process content are made more specific.

Hereinafter, a configuration of the product registration apparatus 10 of this example embodiment will be described in detail. The hardware configuration of the product registration apparatus 10 is the same as that of the second example embodiment.

In FIG. 20, an example of a functional block diagram of the product registration apparatus 10 is illustrated. As illustrated in the figure, the product registration apparatus 10 includes the information acquisition unit 11, the output unit 12, the registration unit 13, the payment processing unit 16, and a number judgment unit 17. The information acquisition unit 11 includes the measurement unit 111, the image generation unit 112, the acquisition unit 113, the position determination unit 114, and number determination unit 117. The output unit 12 can include the output content decision unit 121.

It should be noted that the information acquisition unit 11 may include at least one of the sales time limit determination unit 115 and the shape determination unit 116. The product registration apparatus 10 may include at least one of the time limit judgment unit 14 and the shape judgment unit 15. Further, the output unit 12 may have at least the functions described in the fifth example embodiment, and further have the functions described in the first to fourth example embodiments.

The configurations of the measurement unit 111, the image generation unit 112, the acquisition unit 113, the position determination unit 114, the sales time limit determination unit 115, the shape determination unit 116, the output content decision unit 121, the registration unit 13, the time limit judgment unit 14, the shape judgment unit 15, and the payment processing unit 16 are as described in the example embodiments described above.

The number determination unit 117 determines the number of products 101 placed on the placing table 100. As described in the second example embodiment, according to the measurement unit 111, the image generation unit 112, the acquisition unit 113 and the position determination unit 114, an image analysis result as illustrated in FIG. 9 is generated. The number determination unit 117 can determines the number of pieces of position information included in the image analysis result as the number of products 101 placed on the placing table 100.

The number judgment unit 17 judges whether or not the number of the product 101 from which the product information can be acquired coincides with the number of the product 101 determined by the number determination unit 117. The number judgment unit 17 can determine the number of pieces of product information included in the image analysis result as illustrated in FIG. 9 as the number of products 101 from which product information can be acquired. Then, the number judgment unit 17 can judge whether or not the numbers of the products 101 coincide with each other, by comparing the number of products 101 from which the product information can be acquired with the number of products 101 determined by the number determination unit 117.

The product registration apparatus 10 of this example embodiment described as above can achieve the same advantageous effects as those of the first to fifth example embodiments.

Here, modification examples applicable to the first to sixth example embodiments will be described. The product registration apparatus 10 includes a camera in place of the measurement apparatus 8A described above. Then, an image including the product 101 placed on the placing table 100 is generated by the camera, and acquisition of product information is realized by analyzing the image. The camera may capture an image of the product 101 from either direction. The product 101 is placed so that the product information faces the camera. Also, in the modification example, the same advantageous effects as those of the first to sixth example embodiments can be realized.

An example of a reference form will be added below.

1. A product registration apparatus including:

an information acquisition unit that determines a placement position of a product having a placing table surface side to which product information is attached and acquires the product information attached to the product; and an output unit that outputs information indicating at least one of the placement position of the product from which the product information can be acquired and the placement position of the product from which the product information cannot be acquired.

2. A product registration apparatus including:

an information acquisition unit that determines the number of products placed on a placing table and acquires product information attached to the product; and an output unit that, in a case where the number of products from which the product information can be acquired does not coincide with the number of products determined by the information acquisition unit, outputs information indicating that the numbers of the products do not coincide with each other.

3. The product registration apparatus according to 1 or 2, in which the information acquisition unit includes a measurement unit that emits laser light towards the product and receives reflected light of the laser, an image generation unit that generates an image on the basis of measurement data generated by the measurement unit, and an acquisition unit that acquires the product information on the basis of the image.

4. The product registration apparatus according to any one of 1 to 3, in which the information acquisition unit includes a position determination unit that determines the placement position of the product placed on the placing table, and the output unit displays information indicating at least one of the placement position of the product from which the product information can be acquired and the placement position of the product from which the product information cannot be acquired, on the placing table.

5. The product registration apparatus according to any one of 1 to 4, in which the information acquisition unit includes a sales time limit determination unit that determines a sales time limit of the product on the basis of the product information, the product registration apparatus further includes a time limit judgment unit that judges whether or not the sales time limit has passed, and the output unit makes notification of the product of which the sales time limit has passed.

6. The product registration apparatus according to any one of 1 to 5, in which the information acquisition unit includes a shape determination unit that determines a shape of the product, the product registration apparatus further includes a shape judgment unit that judges whether or not the determined shape matches the acquired product information, and the output unit outputs information indicating a determination result of the shape judgment unit.

7. The product registration apparatus according to any one of 1 to 6, in which the output unit displays an image of the product determined by the product information acquired by the information acquisition unit.

8. A product registration method executed by a computer, the method including:

determining a placement position of a product having a placing table surface side to which product information is attached and acquiring the product information attached to the product; and outputting information indicating at least one of the placement position of the product from which the product information can be acquired and the placement position of the product from which the product information cannot be acquired.

9. A program causing a computer to function as:

an information acquisition unit that determines a placement position of a product having a placing table surface side to which product information is attached and acquires the product information attached to the product; and an output unit that outputs information indicating at least one of the placement position of the product from which the product information can be acquired and the placement position of the product from which the product information cannot be acquired.

10. A product registration method executed by a computer, the method including:

determining the number of products placed on a placing table and acquiring product information attached to the product; and in a case where the number of products from which the product information can be acquired does not coincide with the number of products determined in the step of determining of the number of products, outputting information indicating that the numbers of the products do not coincide with each other.

11. A program causing a computer to function as:

an information acquisition unit that determines the number of products placed on a placing table and acquires the product information attached to the product; and an output unit that, in a case where the number of products from which the product information can be acquired does not coincide with the number of products determined by the information acquisition unit, outputs information indicating that the numbers of the products do not coincide with each other.

It is apparent that the present invention is not limited to the above embodiment, and may be modified and changed without departing from the scope and spirit of the invention.

REFERENCE NUMERALS

1A: processor
2A: memory

21

3A: input and output I/F
4A: peripheral circuit
5A: bus
6A: input apparatus
7A: output apparatus
8A: measurement apparatus
10: product registration apparatus
11: information acquisition unit
111: measurement unit
112: image generation unit
113: acquisition unit
114: position determination unit
115: sales time limit determination unit
116: shape determination unit
117: number determination unit
12: output unit
121: output content decision unit
13: registration unit
14: time limit judgment unit
15: shape judgment unit
16: payment processing unit
17: number judgment unit
100: placing table
101: product
C: code
L: light source
M1: mark
M2: mark
M3: mark

What is claimed is:

1. An information processing apparatus comprising:
at least one memory configured to store one or more instructions; and
at least one processor configured to execute the one or more instructions to:
determine a first number of products in a captured image by analyzing the captured image;
analyze the captured image to detect a code attached to each of one or more products in the captured image;
determine a second number of the one or more products from which product information is acquirable based on the detected code; and
in a case in which the second number does not coincide with the first number, notify a user of information indicating that the first number and the second number do not coincide with each other.

2. The information processing apparatus according to claim 1, wherein the processor is further configured to execute the one or more instructions to acquire the product information of the one or more products in the captured image based on the captured image.

3. The information processing apparatus according to claim 1, wherein the product information is attached to the one or more products.

4. The information processing apparatus according to claim 1, wherein the processor is further configured to execute the one or more instructions to:
determine whether or not a sales time limit of each of the one or more products has passed; and
make a notification of a product, among the one or more products, whose sales time limit has passed.

5. The information processing apparatus according to claim 1, wherein the processor is further configured to execute the one or more instructions to:
determine a shape of the one or more products; and

determine whether or not a shape shown by the product information matches the determined shape of the one or more products.

6. The information processing apparatus according to claim 1, wherein the processor is further configured to execute the one or more instructions to display an image, determined by the product information, of the one or more products.

7. The information processing apparatus according to claim 1,
wherein the one or more products is placed on a placing table,
wherein the placing table is configured to transmit light,
wherein the processor is further configured to execute the one or more instructions to:
emit light towards the one or more products placed on the placing table through the placing table, and receive reflected light;
generate the captured image based on measurement data of the reflected light; and
acquire the product information based on the captured image.

8. The information processing apparatus according to claim 1,
wherein the first number of the products is determined based on a featured value of an appearance of the products.

9. The information processing apparatus according to claim 8, wherein the product information is acquired from a code attached to the one or more products.

10. The information processing apparatus according to claim 9, wherein the processor is further configured to execute the one or more instructions to determine the second number of the one or more products from which the product information can be acquired based on the product information from the code.

11. A method executed by a computer, the method comprising:
determining a first number of products in a captured image by analyzing the captured image;
analyzing the captured image to detect a code attached to each of one or more products in the captured image;
determining a second number of the one or more products from which product information is acquirable based on the detected code; and
in a case in which the second number does not coincide with the first number, notify a user of information indicating that the first number and the second number do not coincide with each other.

12. The method according to claim 11, further comprising acquiring the product information of the one or more products based on the captured image.

13. The method according to claim 11, wherein the product information is attached to the one or more products.

14. The method according to claim 11, further comprising:
determining whether or not a sales time limit of each of the one or more products has passed; and
making a notification of a product, among the one or more products, whose sales time limit has passed.

15. The method according to claim 11, further comprising:
determining a shape of the one or more products; and
determining whether or not a shape shown by the product information matches the determined shape of the one or more products.

16. The method according to claim 11, further comprising:

displaying an image, determined by the product information, of the one or more products.

17. The method according to claim 11, wherein the product is placed on a placing table, wherein the placing table is configured to transmit light, and wherein the method further comprises:

emitting light towards the product placed on the placing table through the placing table, and receiving reflected light;

generating the captured image based on measurement data of the reflected light; and acquiring the product information based on the captured image.

18. A non-transitory storage medium storing a program causing a computer to:

determine a first number of products in a captured image by analyzing the captured image;

analyzing the captured image to detect a code attached to each of one or more products in the captured image;

determining a second number of the one or more products from which product information is acquirable based on the detected code; and in a case in which the second number does not coincide with the first number, notify a user of information indicating that the first number and the second number do not coincide with each other.

* * * * *